(12) United States Patent
McPeak et al.

(10) Patent No.: US 9,470,303 B2
(45) Date of Patent: Oct. 18, 2016

(54) SELF SCAVENGING GEAR SHIELD

(71) Applicant: Sikorsky Aircraft Corporation, Stratford, CT (US)

(72) Inventors: Jason DeWitt McPeak, Lakeside, TX (US); Stephen R. Sammataro, Madison, CT (US); Scott Bradley Poteet, Dallas, TX (US); Michael John Orazietti, Derby, CT (US); Jules Gene Kish, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 262 days.

(21) Appl. No.: 14/048,795

(22) Filed: Oct. 8, 2013

(65) Prior Publication Data

US 2015/0097073 A1    Apr. 9, 2015

(51) Int. Cl.
*F16H 57/04* (2010.01)
*B64C 27/12* (2006.01)
*F16N 31/00* (2006.01)

(52) U.S. Cl.
CPC .......... *F16H 57/0423* (2013.01); *B64C 27/12* (2013.01); *F16N 31/00* (2013.01); *Y10T 74/19991* (2015.01)

(58) Field of Classification Search
CPC .......... F16H 57/0423; F16H 57/0421; F16H 57/0434; B64C 27/12; Y10T 74/19991; F16N 31/00
See application file for complete search history.

(56) References Cited

U.S. PATENT DOCUMENTS

| | | |
|---|---|---|
| 3,126,980 A | 3/1964 | Barnes et al. |
| 3,259,210 A | 7/1966 | Beebe et al. |
| 4,525,995 A | 7/1985 | Clark |
| 4,715,244 A | 12/1987 | Byrd et al. |
| 5,002,155 A | 3/1991 | Marglin |
| 5,048,370 A | 9/1991 | Duello |
| 5,411,116 A | 5/1995 | Kish et al. |
| 7,905,325 B1 | 3/2011 | Wedlake et al. |
| 7,971,507 B2 | 7/2011 | Swainson |
| 2006/0056749 A1 | 3/2006 | Swainson |
| 2009/0314580 A1 | 12/2009 | Jabs et al. |
| 2010/0012075 A1 | 1/2010 | Bluhm |
| 2013/0180803 A1 | 7/2013 | Tanaka et al. |

OTHER PUBLICATIONS

Notification of Transmittal of the International Search Report of the International Searching Authority, or the Declaration; PCT/US14/59255; Mailed Oct. 6, 2015; 7 Pages.
Notification of Transmittal of the Written Opinion of the International Searching Authority, or the Declaration; PCT/US14/59255; Mailed Oct. 6, 2015; 7 Pages.

*Primary Examiner* — Valentina Xavier
(74) *Attorney, Agent, or Firm* — Cantor Colburn LLP

(57) ABSTRACT

A gearbox assembly includes a gearbox housing and a gear located in the housing and rotatable about a central axis. One or more gear shields are fixed in the housing and at least partially surround the gear. The one or more gear shields define a cavity between the gear and the one or more gear shields. The one or more gear shields are configured such that a pumping action is created by the gear rotation to direct gearbox lubricant out of the cavity. A method of scavenging lubricant from a gearbox includes pumping a flow of lubricant circumferentially around a cavity defined between a gear and a gear shield at least partially surrounding the gear via rotation of the gear about a central axis. The flow of lubricant is urged from the cavity into a lubricant outlet. The lubricant is urged through a lubricant channel in an axial direction.

16 Claims, 4 Drawing Sheets

SELF SCAVENGING GEAR SHIELD

BACKGROUND

The subject matter disclosed herein relates to transmission gears and, more specifically, to lubrication of transmission gears.

Rotating gears that are utilized to transmit power and/or rotational speed, such as those in a gearbox of a rotary wing aircraft like helicopters, are typically lubricated and/or cooled by a lubricant. The cooling is either by direct spray of the lubricant onto the gears, or by a lubricant bath. In some operating conditions, lubricant is not circulated through the system quickly enough, so that lubricant levels around the gears rise. When lubricant levels rise above a selected level, friction generated between the gear and the lubricant increases. This increased friction caused by the excess amount of lubricant in contact with the gears results in an increased gearbox temperature and decreased power output from the gearbox. The increased friction can further result in a lubricant churning event, in which the result is a rapid, uncontrollable temperature rise and loss of power.

BRIEF DESCRIPTION

In one embodiment, a gearbox assembly includes a gearbox housing and a gear located in the housing and rotatable about a central axis. One or more gear shields are fixed in the housing and at least partially surround the gear. The one or more gear shields define a cavity between the gear and the one or more gear shields. The one or more gear shields are configured relative to the gear such that a pumping action is created by the gear rotation relative to the gear shield to direct gearbox lubricant out of the cavity.

In another embodiment, a rotary-winged aircraft includes an airframe and a rotor assembly operably connected to the airframe. A drive system is operably connected to the rotor assembly to drive motion thereof. The drive system includes a gearbox assembly having a gearbox housing and a gear located in the housing and rotatable about a central axis. One or more gear shields are fixed in the housing and at least partially surround the gear. The one or more gear shields define a cavity between the gear and the one or more gear shields. The one or more gear shields are configured relative to the gear such that a pumping action is created by the gear rotation relative to the gear shield to direct gearbox lubricant out of the cavity.

In yet another embodiment, a method of scavenging lubricant from a gearbox includes pumping a flow of lubricant circumferentially around a cavity defined between a gear and a gear shield at least partially surrounding the gear via rotation of the gear about a central axis. The flow of lubricant is urged from the cavity into a lubricant outlet. The lubricant is urged from the lubricant outlet through a lubricant channel in the gear shield in an at least partially axial direction.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
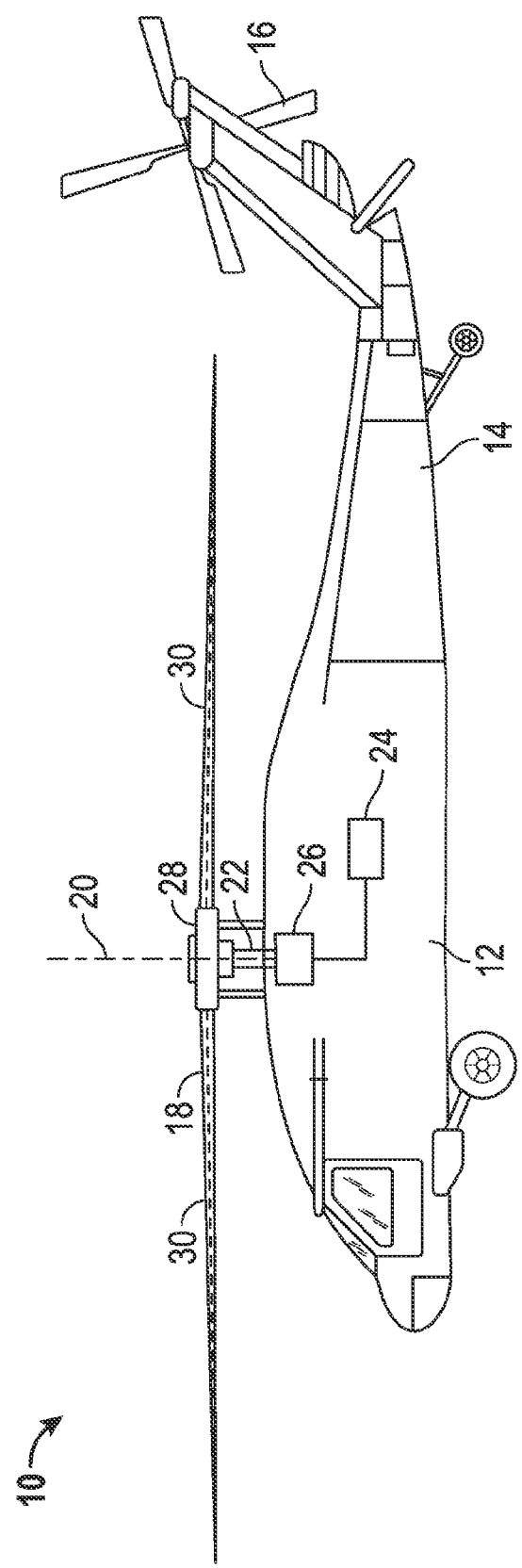
FIG. 1 is a schematic view of an embodiment of a helicopter.

Shown in FIG. 1 is schematic view of an embodiment of a rotary wing aircraft, in this embodiment a helicopter 10. The helicopter 10 includes an airframe 12 with an extending tail 14 and a tail rotor 16 located thereat. While the embodiment of a helicopter 10 described herein includes an extending tail 14 and tail rotor 16, it is to be appreciated that the disclosure herein may be applied to other types of rotor craft including coaxial rotor craft. A main rotor assembly 18 is located at the airframe 12 and includes a plurality of blade assemblies 30 arranged at a rotor hub 28 and rotates about a main rotor axis 20. The main rotor assembly 18 is driven by a drive shaft 22 connected to a power source, for example, an engine 24 by a gearbox 26.

Figure 2:
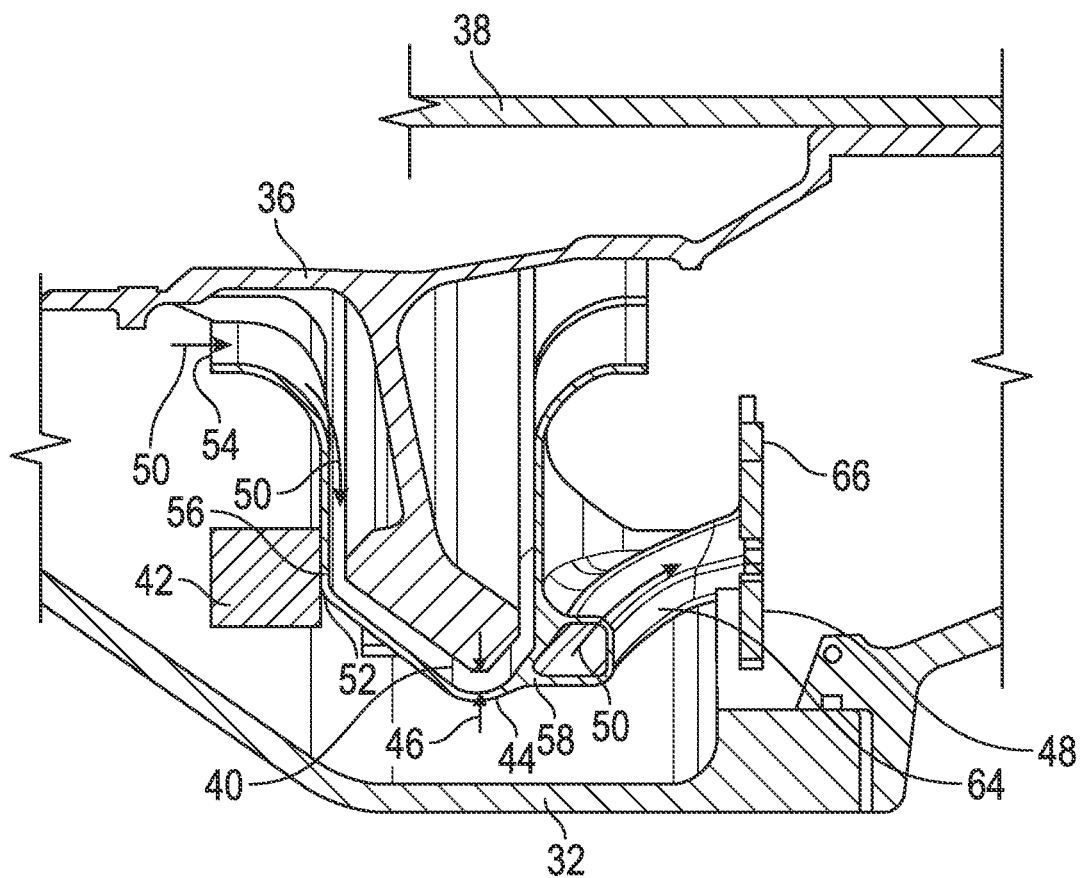
FIG. 2 is a cross-sectional view of an embodiment of a gearbox assembly for a helicopter.
Figure 3:
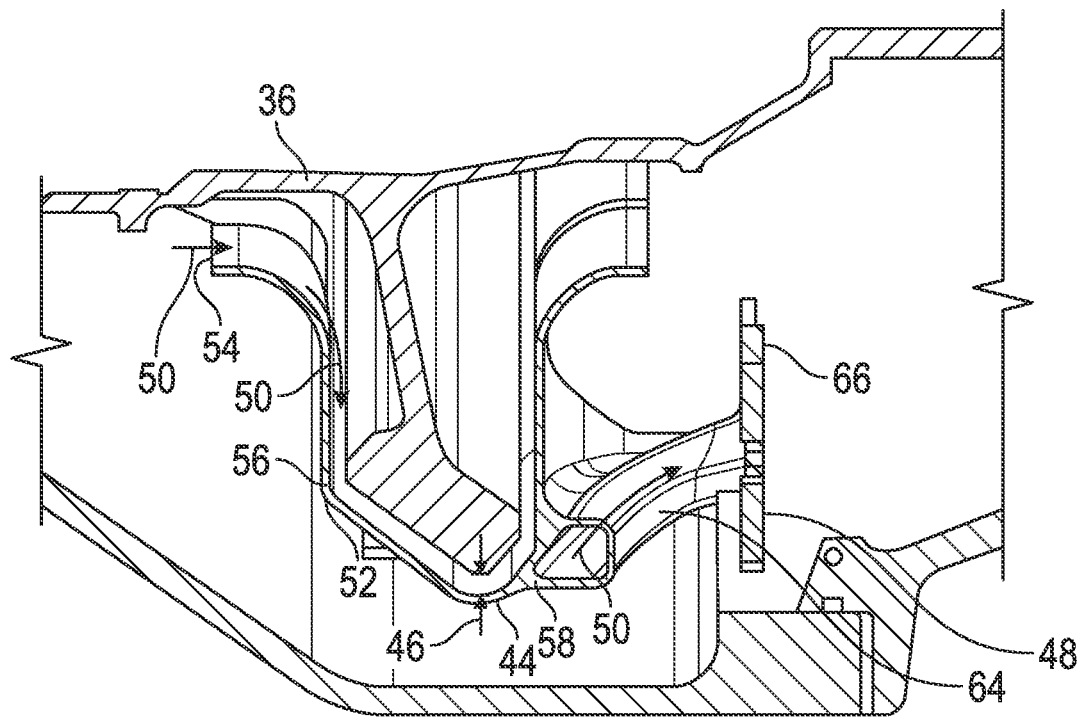
FIG. 3 is a cross-sectional view of a gear shield assembly and gear of a gearbox assembly.

Shown in FIG. 2 is a partial cross-sectional view of an embodiment of the gearbox 26. The gearbox 26 includes a housing 32 containing one or more gears, for example bevel gear 36, located at a gearbox shaft 38 and rotatable thereat. While the illustrated embodiment utilizes a bevel gear 36, it is to be appreciated that other rotating gear elements may be utilized. A shield assembly 40 at least partially surrounds the bevel gear 36. The shield assembly 40 is fixed to, for example the housing 32 or support member 42. Referring now to FIG. 3, the shield assembly 40 includes one or more shields 44 in the shown embodiment, for example, there is an first shield 44 and a second shield 44 installed around the bevel gear 36 such that there is a shield gap 46 in a radial direction between the bevel gear 36 and an interior 48 of the shields 44. While two shields 44 are depicted in FIG. 3, it is to be appreciated that in other embodiments other quantities of shields 44, for example, 1, 3 or 4 shields 44 may be utilized. The shields 44 are configured to route excess oil or other fluid away from the bevel gear 36, through a pumping action via rotation of the bevel gear 36, as will be described in greater detail below. Further, while the shields 44 are utilized in some embodiments, it is to be appreciated that other conformal elements may be utilized. For example, the housing 32 may be made to be conformal to define the gap 46 and facilitate the pumping action of the bevel gear 36.

Figure 4:
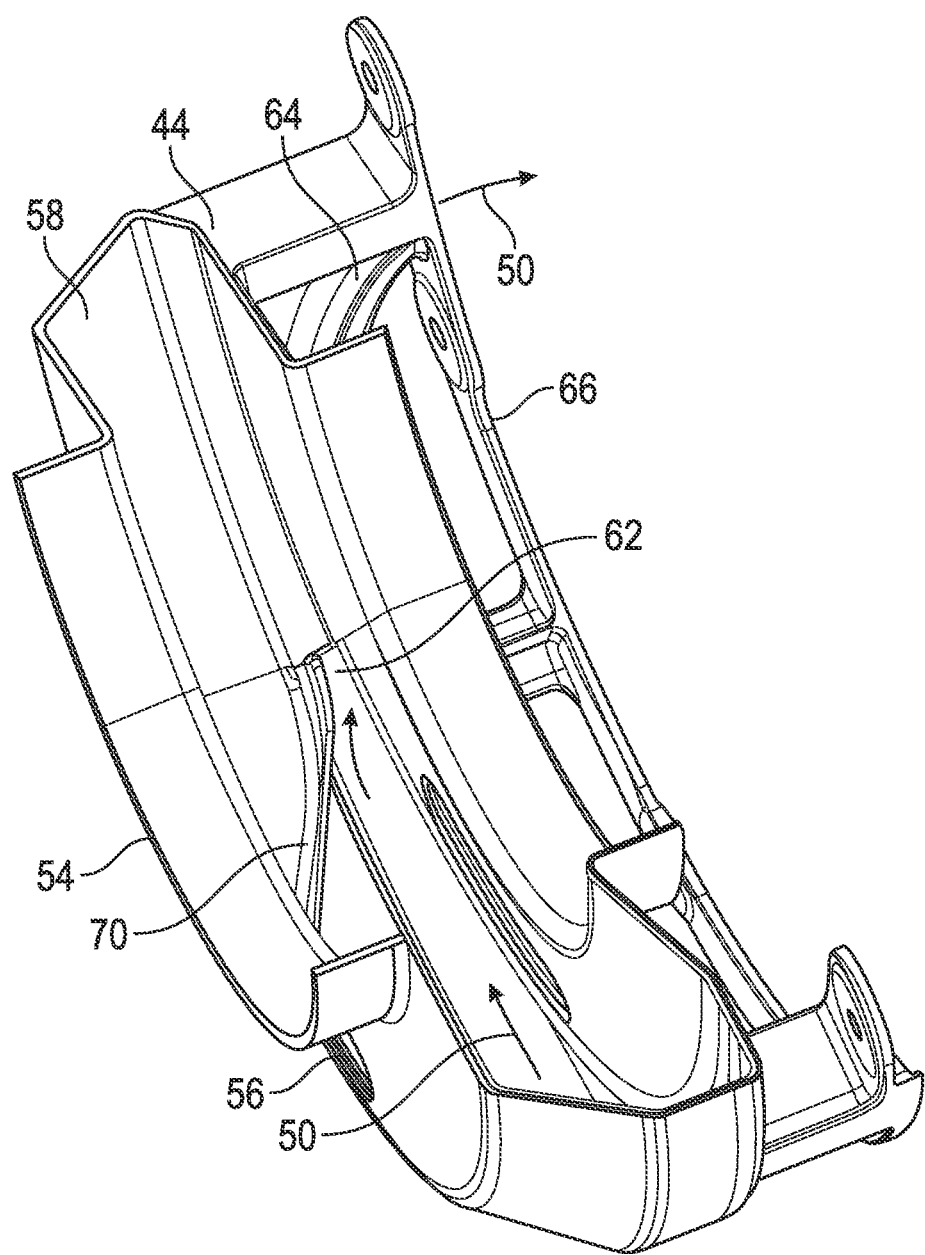
FIG. 4 is a perspective view of a gear shield for a gearbox assembly.

The shields 44 serve initially as a barrier to intrusion of excess lubricant 50 around the bevel gear 36, with exterior walls 52 of the shields 44 extending radially inwardly toward the gearbox shaft 38. As the lubricant level rises, lubricant 50 spills over a lip 54 of the shield 44 into an interior cavity 58 between the bevel gear 36 and the shield 44, or alternatively, through one or more inlet openings 56 in the shield 44. Referring to FIG. 4, as the bevel gear 36 rotates, the lubricant 50 is urged circumferentially around the cavity 58 toward a lubricant outlet 62.

Referring again to FIG. 3, a flow channel 64 extends from the lubricant outlet 62 at the cavity 58, circumferentially around the shield 44 and axially along the shield 44 away from the bevel gear 36 to an output end 66 of the shield 44. The lubricant 50 is pumped through the lubricant outlet 62 and the flow channel 64 to, for example, a lubricant sump (not shown) for continued circulation through the gearbox 26. In some embodiments, the flow channel 64 is substantially S-shaped. Referring again to FIG. 4, in some embodiments, a diverter 70 is positioned in the cavity 58 to direct the lubricant 50 axially toward the lubricant outlet 62 as the lubricant flows circumferentially. The diverter 70 shown in FIG. 4 is a raised ridge or scraper, which obstructs the circumferential flow and diverts it into an at least partially axial direction toward the lubricant outlet 62.

The shape of the shield 44 substantially conforms to the bevel gear 46 and is close to the bevel gear 46 such that the rotation of the bevel gear 46 creates the pumping action that removes the lubricant 50. Rotation of the bevel gear 36 lowers an inlet pressure at the inlet openings 56, thus drawing lubricant 50 into the shield 44. As the bevel gear 36 continues to rotate, lubricant 50 in the shield 44 is pressurized and urged toward the lubricant outlet 62. Removing the excess lubricant 50 from around the bevel gear 36 through the shield 44 via the pumping action of the bevel gear 36 reduces friction between the bevel gear 36 and the lubricant 50, thus maintaining power output from the friction generated between the gear and the oil increases.

While the invention has been described in detail in connection with only a limited number of embodiments, it should be readily understood that the invention is not limited to such disclosed embodiments. For instance, while described in the context of a gear box in a helicopter, aspects of the disclosure can be applied to gear boxes in other motor-transmissions in which lubricant is supplied. Examples include automobiles, aircraft and locomotives. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed:

1. A gearbox assembly comprising:
   a gearbox housing;
   a gear disposed in the housing and rotatable about a central axis; and
   one or more gear shields fixed in the housing and at least partially surrounding the gear and defining a cavity between the gear and the one or more gear shields,
   the one or more gear shields comprising a lip over which lubricant spills into the cavity and an exterior wall that extends radially inwardly toward the lip,
   the one or more gear shields being configured relative to the gear such that a pumping action is created by the gear rotation relative to the gear shield to direct gearbox lubricant circumferentially around the cavity and toward an out of the cavity.

2. The gearbox assembly of claim 1, wherein each gear shield includes a lubricant outlet for flowing the gearbox lubricant from the cavity.

3. The gearbox assembly of claim 2, wherein the lubricant outlet is disposed in an axial wall of the gear shield.

4. The gearbox assembly of claim 2, further comprising a flow diverter in the cavity to direct the lubricant flow toward the lubricant outlet.

5. The gearbox assembly of claim 1, wherein each gear shield further includes a flow channel to direct the lubricant flow out of the cavity in a substantially axial direction.

6. The gearbox assembly of claim 5, wherein the flow channel is substantially S-shaped.

7. The gearbox assembly of claim 1, wherein the gear is a bevel gear comprising:
   an axial portion extending axially about the central axis; and
   a radial portion extending radially from the axial portion,
   wherein the exterior wall extends radially inwardly toward the lip along the radial portion and curvilinearly along the axial portion.

8. The gearbox assembly of claim 1, wherein the one or more gear shields are two gear shields.

9. A rotary-winged aircraft comprising:
   an airframe;
   a rotor assembly operably connected to the airframe; and
   a drive system operably connected to the rotor assembly to drive motion thereof, the drive system including a gearbox assembly having:
   a gearbox housing;
   a gear disposed in the housing and rotatable about a central axis; and
   one or more gear shields fixed in the housing and at least partially surrounding the gear and defining a cavity between the gear and the one or more gear shields,
   the one or more gear shields comprising a lip over which lubricant spills into the cavity and an exterior wall that extends radially inwardly toward the lip,
   the one or more gear shields being configured relative to the gear such that a pumping action is created by the gear rotation relative to the gear shield to direct gearbox lubricant circumferentially around the cavity and toward an outlet of the cavity.

10. The rotary-winged aircraft of claim 9, wherein each gear shield includes a lubricant outlet for flowing the gearbox lubricant from the cavity.

11. The rotary-winged aircraft of claim 10, wherein the lubricant outlet is disposed in an axial wall of the gear shield.

12. The rotary-winged aircraft of claim 10, further comprising a flow diverter in the cavity to direct the lubricant flow toward the lubricant outlet.

13. The rotary-winged aircraft of claim 9, wherein each gear shield further includes a flow channel to direct the lubricant flow out of the cavity in a substantially axial direction.

14. The rotary-winged aircraft of claim 13, wherein he flow channel is substantially S-shaped.

15. The rotary-winged aircraft of claim 9, wherein the gear is a bevel gear comprising:
   an axial portion extending axially about the central axis; and
   a radial portion extending radially from the axial portion,
   wherein the exterior wall extends radially inwardly toward the lip along the radial portion and curvilinearly along the axial portion.

16. The rotary-winged aircraft of claim 9, wherein the one or more gear shields are two gear shields.

* * * * *